United States Patent
Watanabe et al.

[11] Patent Number: 5,914,548
[45] Date of Patent: Jun. 22, 1999

[54] SEALED ACTUATOR

[75] Inventors: Hayao Watanabe; Atsushi Horikoshi, both of Gunma, Japan

[73] Assignee: NSK Ltd., Tokyo, Japan

[21] Appl. No.: 08/773,180

[22] Filed: Dec. 27, 1996

[30] Foreign Application Priority Data

Dec. 28, 1995 [JP] Japan .................................. 7-343805
Dec. 25, 1996 [JP] Japan .................................. 8-355764

[51] Int. Cl.⁶ ............................ H02K 5/10; H02K 11/00; H02K 7/20
[52] U.S. Cl. ......................... 310/88; 310/68 B; 310/112
[58] Field of Search .................................. 310/68 B, 84, 310/86, 88, 89, 112, 114

[56] References Cited

U.S. PATENT DOCUMENTS

| | | | |
|---|---|---|---|
| 2,669,667 | 2/1954 | Haines | 310/40 |
| 2,809,310 | 10/1957 | Dunn et al. | 310/86 |
| 2,993,131 | 7/1961 | Trevitt | 310/86 |
| 3,686,556 | 8/1972 | Anger et al. | 318/595 |
| 4,893,078 | 1/1990 | Auchterlonie | 318/660 |
| 5,270,600 | 12/1993 | Hashimoto | 310/75 |
| 5,291,087 | 3/1994 | Pollick et al. | 310/86 |
| 5,394,043 | 2/1995 | Hsai | 310/88 |
| 5,446,966 | 9/1995 | Ishizaki | 318/605 |
| 5,469,035 | 11/1995 | Lowrance | 318/568.1 |
| 5,641,276 | 6/1997 | Heidelberg et al. | 417/423.7 |

FOREIGN PATENT DOCUMENTS

| | | | |
|---|---|---|---|
| 3-150041 | 6/1991 | Japan | H02K 5/12 |
| 3-150042 | 6/1991 | Japan | H02K 5/12 |
| WO 94/23911 | 10/1994 | WIPO | B25J 21/00 |

*Primary Examiner*—Clayton LaBalle
*Attorney, Agent, or Firm*—Sughrue, Mion, Zinn, Macpeak & Seas, PLLC

[57] ABSTRACT

A sealed actuator includes a motor stator having rotation-drive magnetic poles; a motor rotor arranged so as to confront magnetic pole surfaces of the motor stator while interposing a small distance therebetween and rotatably supported through roller bearings; and displacement detecting means for measuring displacement of the motor rotor. A partition wall made of a nonmagnetic metal is disposed in a clearance between the motor stator and the motor rotor, so that the inner space where the motor stator is disposed is hermetically covered. The bearings are disposed at both sides of the partition wall in the axial direction so that the load applied to the bearings are directly received by a housing. At least a part of the partition wall is reinforced by reinforcing members and a mold agent is charged into the space on the motor stator side.

24 Claims, 7 Drawing Sheets

SEALED ACTUATOR

BACKGROUND OF THE INVENTION

The present invention relates to sealed actuators, and more particularly to a sealed actuator adapted for use in an ultra-high vacuum environment in which even small amounts of contaminants and impure gases are not admitted or in an environment in which magnetic poles and coils of a motor become corroded, such as in a corrosive gas environment.

For example, in semiconductor manufacturing, a workpiece is worked in an ultra-high vacuum environment in order to eliminate impurities to a possible extent. In an actuator employed in such a case, a lubricant that contains volatile component such as ordinary grease is not allowed to be used for bearings of a drive shaft of a drive motor for, e.g., a workpiece positioning apparatus. Therefore, the inner and outer races of such bearings are plated with soft metal such as gold or silver. Further, the coil insulators and wiring sheathes of the motor, the adhesives of laminated magnetic poles, and the like are made of stable materials having good heat resistance and discharging relatively small amounts of gases.

On the other hand, as means for introducing rotational output into an ultra-high vacuum vessel from outside, various types of actuators such as a bellows type drive system, a magnetic coupling drive system, a magnetic fluid seal drive system have heretofore been known. These actuators are so constructed that the output end of a rotating shaft supported by vacuum bearings is projected into the vacuum environment and that rotating force is transmitted to the input end by a drive apparatus disposed in the atmosphere. More specifically, a bellows type drive system is designed as follows. As shown in FIG. 6, an output end 101A of a rotating shaft 101 is projected into a vacuum environment V while being supported by vacuum bearings 102, and when an inclined-plate type oscillating mechanism 103 on the other end 101B is driven to rotate by a rotating apparatus 105 disposed in the atmosphere, a bellows 104 repeats expansion and contraction, so that the rotating shaft 101 is rotated.

In contrast thereto, a magnetic coupling drive system is designed as follows. A rotor made of a magnetic substance is secured to the input end of a rotating shaft with the outer circumference of the rotor being hermetically sealed by a housing. A magnet is arranged on the side of the atmosphere so as to surround the rotor while the housing being interposed. The magnet is rotated to thereby rotate the rotating shaft.

Further, a magnetic fluid seal drive system is designed as follows. A housing made of a nonmagnetic substance is arranged so as to pass through a partition wall disposed between the atmosphere side and the vacuum side. Not only circular-ring-like pole pieces sandwiching a permanent magnet therebetween are arranged between bearings disposed in the housing, but also a clearance between the outer circumferential surface of a rotating shaft passing through the housing and the inner circumferential surface of the pole pieces confronting the outer circumferential surface of the rotating shaft is sealed with a magnetic fluid.

Recently, higher integration of semiconductors is accompanied with higher density by miniaturizing IC pattern widths. In order to fabricate wafers that can meet such miniaturization needs, a high degree of consistency for wafer quality is required. To meet such needs, it is important to reduce impure gas concentration in wafers in a low-pressure gas processing chamber. Further, in order to implement miniaturization as required, an extremely highly accurate positioning apparatus must be employed.

From these viewpoints, the aforementioned conventional actuators have the following problems.

In the case of a drive motor used for an ultra-high vacuum apparatus:

(1) Even if highly heat-resistant, stable materials that discharges relatively small amounts of gases are selected for the coils, insulators, wiring sheathes, and the like of the drive motor, these materials still impose problems as long as they are organic insulating materials. Since an organic insulating material is porous and has numerous holes over the surface when observed microscopically. When such material is exposed to the atmosphere, gas, moisture, and the like are adsorbed into the holes on the surface thereof. It takes much time to degas such adsorbed impure molecules by means of evacuation, which is most likely to reduce production efficiency.

(2) In addition, no heat radiation by air convection occurs in a vacuum. Therefore, if coil temperature increases locally, resistance at such local part increases to accelerate heating, which in turn makes the coil insulating film susceptible to burning.

(3) On the other hand, it is conceivable to reduce adsorbed impure molecules by using inorganic materials for coil insulators and sheathed wires in stainless conduits for wiring. However, this measure not only entails large costs, but also imposes the problem that the motor capacity is reduced due to the fact that the rate of conductors such as copper in the coil winding space is reduced to increase electric resistance.

In contrast to the aforementioned problems imposed when an actuator is disposed in an ultra-high vacuum apparatus, the following problems arise in the cases where the drive section of an actuator is disposed outside a vacuum apparatus as in the bellows type drive system, the magnetic coupling drive system, the magnetic fluid seal drive system, and the like.

In the bellows type drive system, large backlash occurs. In the magnetic coupling drive system in which rotating force is transmitted by the attracting force of a magnet, rigidity is reduced. That is, highly accurate positioning requirements cannot be met by these systems.

Further, in the magnetic fluid seal drive system, the magnetic fluid has a heat resistance temperature of about 70° C., which is a relatively low temperature. Therefore, the magnetic fluid is not resistant to heating temperatures during a bake-out process in an ultra-high vacuum vessel (the process of discharging adsorbed gas and water molecules contained in an inner wall of a vacuum vessel and the like). As a result, the magnetic fluid, containing a small amount of volatile component, discharges gas disadvantageously.

To overcome these problems of the conventional actuators, the present applicant proposed a sealed actuator in Japanese Patent Unexamined Publication Nos. Hei. 3-150041 and Hei. 3-150042. This actuator is characterized by discharging no impure gas in an ultra-high vacuum environment and achieving highly accurate positioning. This actuator includes: a motor stator having rotation-drive magnetic poles excited by rotation-drive coils; a motor rotor arranged so as to confront the magnetic pole surfaces of the motor stator while having a small clearance with respect to the magnetic pole surfaces and rotatably supported through roller bearings; and a resolver serving as a displacement detecting means for measuring a displacement of the motor rotor. The actuator has a partition wall made of a nonmagnetic metal between the motor stator and the motor rotor so that the inner space within which the motor stator is disposed is hermetically covered with the partition wall, which in turn allows the motor stator side space to be isolated from the motor rotor side space.

In the sealed actuator described above, since the motor stator is isolated from the motor rotor by the partition wall made of a nonmagnetic metal, even if the. actuator is used in a high vacuum environment or reactive gas environment of a semiconductor manufacturing apparatus, neither impure gases are discharged from the coils and organic insulators of the actuator to contaminate the environment nor are the coils and organic insulators eroded. In addition, the formation of a magnetic circuit is not hindered between the motor stator and the motor rotor. Moreover, highly accurate positioning can be implemented by the resolver. Thus, such actuator is highly useful in practical use.

However, the thickness of the partition wall made of a nonmagnetic metal must be so limited as not to hinder the formation of a magnetic circuit between the motor stator and the motor rotor in particular. Thus, when exposed to an ultra-high vacuum, the partition wall may be swollen.

Further, as a drive apparatus of a magnetic coupling drive system, the configuration as shown in FIG. 7 is known. That is, an attachment flange 201 is attached to an opening of a bottom wall 202 of a vacuum container. In the inside of housings 216 and 236 positioned outside of the vacuum container, two drive shafts of an outer drive shaft 204 and an inner drive shaft 205 are coaxially disposed and extend outside of the housing through the opening. The outer drive shaft 204 positioned in the vacuum container is supported by bearings 206 at the tip portion of the inner drive shaft 205.

Further, a motor rotor 207 is supported on an outer surface of the outer drive shaft 204. A motor stator 208 corresponding thereto is supported on an outer housing 216 of the motor rotor 207. Similarly, a motor rotor 209 is supported on an outer surface of the inner drive shaft 205. A motor stator 210 corresponding thereto is supported on an outer housing 236 of the motor rotor 209. The motor rotors 207 and 209 are disposed in a vacuum state, and the motor stators 208 and 210 are disposed outside of the vacuum state.

The outer drive shaft 204 is supported on the housing 216 through bearings 218 and 219, and the inner drive shaft 205 is supported on the housing 236 through bearings 238 and 239. Between the motor rotor 207 and the motor stator 208, and between the motor rotor 209 and the motor stator 210, thin nonmetal partition walls 216a and 236a extended from the housing 216 and the housing 236 are respectively located to keep the vacuum state in the side of the motor rotors 207 and 209.

In such a configuration, for the improvement of performance of a motor, it is required to prevent the decrease in magnetic flux to a possible degree between the motor rotor and the motor stator by the nonmetal partition wall. For the purpose, the thickness of the partition wall must be as thin as possible. Thus, since the outer drive shaft 204 and the inner drive shaft 205 are supported by the bearings disposed in the housings 216 and 236 including the thin partition wall, the conventional drive apparatus has a problem that supporting rigidity of the respective drive shafts to the housings is lowered. If an arm or the like is attached to the tip of the drive shaft of the drive apparatus having such a structure and a load is applied to the tip, the force acting on the bearings acts also on the partition wall so that such a possibility can not be neglected that the partition wall is deformed or the partition wall is broken, which is a problem of the conventional apparatus.

Further, since the support rigidity of the outer drive shaft 204 and the inner drive shaft 205 are low, there occurs a problem that both the drive shafts are brought into contact with each other by swing due to rotation of both the drive shafts. Accordingly, this prior art overcomes the disadvantage of contact of both the drive shafts by using the pilot bearings 206.

Moreover, high integration of semiconductors requires control of higher accuracy and stability. Under such circumstances, positioning control with a resolver becomes insufficient due to the fact that magnetism from a motor stack surrounds the resolver.

SUMMARY OF THE INVENTION

The present invention has been made in view of the aforementioned problems encountered by the prior art. An object of the invention is therefore to provide a sealed actuator which does not discharge impure gases in an ultra-high vacuum environment, which can achieve highly accurate positioning, and which can maintain sufficient strength.

According to a first aspect of the invention, a sealed actuator comprises: a motor stator including a stator magnetic pole excited by a rotation-drive coil; housings to which said motor stator is attached; a motor rotor including a rotor magnetic pole disposed opposite to a surface of said stator magnetic pole through a gap; bearings for rotatably supporting a rotation shaft of said motor rotor to said housing; displacement measuring means for measuring displacement of said motor rotor; and a hermetically sealing partition wall made of a nonmagnetic metal material and disposed at the gap between said stator magnetic pole and said rotor magnetic pole, a space where said motor rotor is disposed being hermetically isolated from a space where said motor stator is disposed; wherein said bearings are a plurality of rolling bearings, said rolling bearings support said motor rotor at positions on said housings at both sides of a member constituting said sealing partition wall in a longitudinal direction of said motor rotor so that said housing directly receives a load applied to said bearings.

According to a second aspect of the invention, a sealed actuator comprises: a motor stator including a stator magnetic pole excited by a rotation-drive coil; a housing to which said motor stator is attached; a motor rotor including a rotor magnetic pole disposed opposite to a surface of said stator magnetic pole through a gap; bearings for rotatably supporting a rotation shaft of said motor rotor to said housing; displacement measuring means for measuring displacement of said motor rotor; and a hermetically sealing partition wall made of a nonmagnetic metal material and disposed at the gap between said stator magnetic pole and said rotor magnetic pole, a space where said motor rotor is disposed being hermetically isolated from a space where said motor stator is disposed; wherein said displacement measuring means comprises a resolver rotor made of a magnetic metal material, disposed at a side of said motor rotor, and include a salient tooth; and a resolver stator including a detection coil magnetic pole and disposed at a side of said motor stator.

According to a third aspect of the invention, a sealed actuator comprises: a motor stator including a stator magnetic pole excited by a rotation-drive coil; a housing to which said motor stator is attached; a motor rotor including a rotor magnetic pole disposed opposite to a surface of said stator magnetic pole through a gap; bearings for rotatably supporting a rotation shaft of said motor rotor to said housing; displacement measuring means for measuring displacement of said motor rotor; and a hermetically sealing partition wall made of a nonmagnetic metal material and disposed at the gap between said stator magnetic pole and said rotor magnetic pole, a space where said motor rotor is disposed being hermetically isolated from a space where said motor stator is disposed; wherein said sealed actuator further comprises reinforcing means for reinforcing at least a part of said hermetically sealing partition wall.

According to a fourth aspect of the invention, a sealed actuator comprises a plurality of unit sealed actuators connected in series to each other, and each of said unit sealed actuators comprises: a motor stator including a stator magnetic pole excited by a rotation-drive coil; a housing to which said motor stator is attached; a motor rotor including a rotor magnetic pole disposed opposite to a surface of said stator magnetic pole through a gap; bearings for rotatably supporting a rotation shaft of said motor rotor to said housing; displacement measuring means for measuring displacement of said motor rotor; and a hermetically sealing partition wall made of a nonmagnetic metal material and disposed at the gap between said stator magnetic pole and said rotor magnetic pole, a space where said motor rotor is disposed being hermetically isolated from a space where said motor stator is disposed; wherein said bearings are a plurality of rolling bearings, said rolling bearings supporting said motor rotor at positions on said housings at both sides of a member constituting said sealing partition wall in a longitudinal direction of said motor rotor so that said housing directly receives a load applied to said bearings; wherein said rotor magnetic pole includes a salient pole tooth of a steel material of a magnetic substance subjected to salient pole working; and wherein said displacement measuring means comprises a resolver rotor made of a magnetic metal material, disposed at a side of said motor rotor, and include a salient pole tooth; and a resolver stator including a detection coil magnetic pole and disposed at a side of said motor stator.

DETAILED DESCRIPTION OF THE PREFERRED EMBODIMENTS

Preferred embodiments of the invention will now be described with reference to the drawings.

Figure 1:
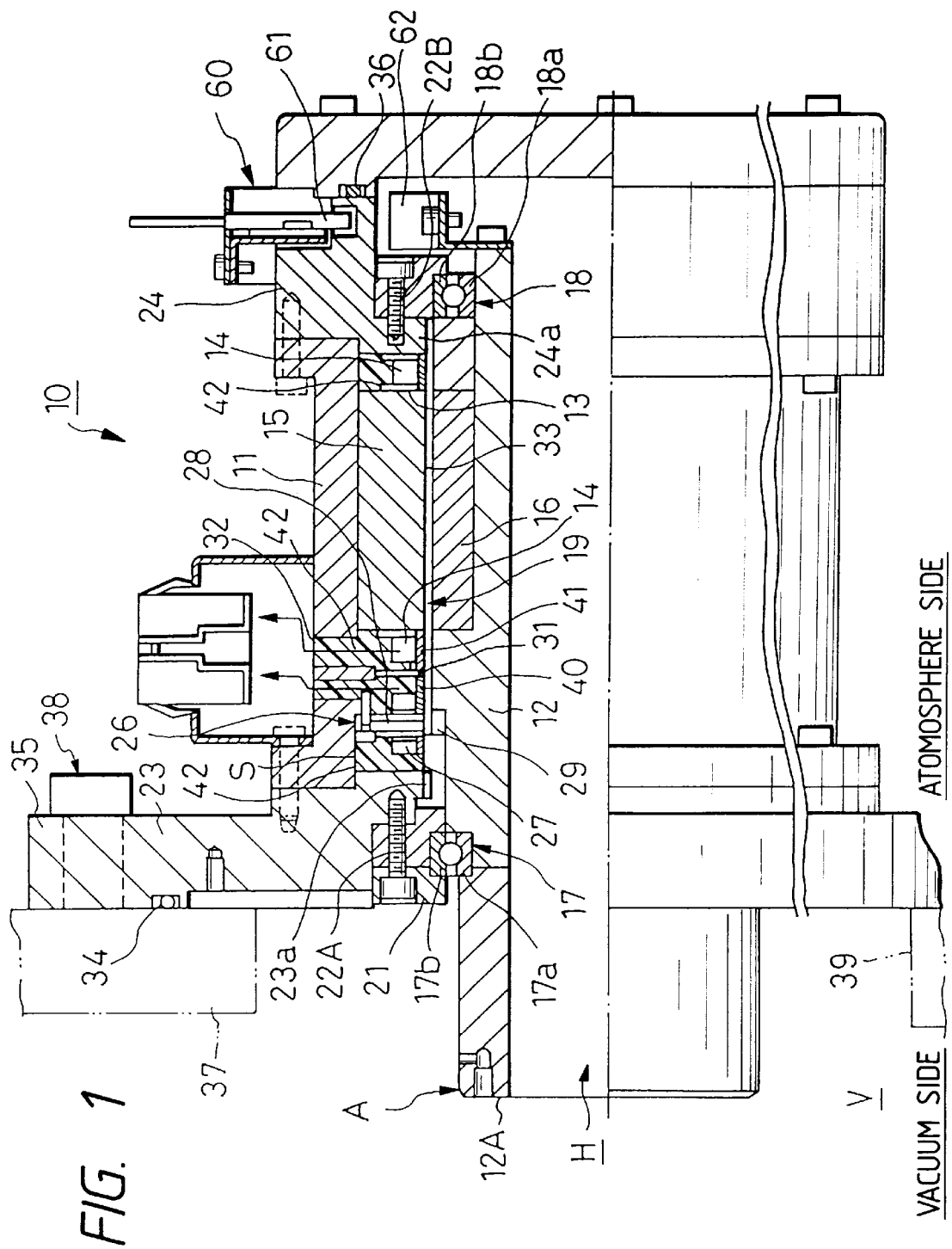
FIG. 1 is a side sectional view showing a sealed actuator of a first embodiment of the invention.

A sealed actuator 10 shown in FIG. 1 is a so-called inner-rotor direct-drive motor in which a motor rotor 12 rotates inside a motor stator 11. More specifically, the sealed actuator 10 is a variable-reluctance stepping motor.

The motor stator 11 is cylindrical and has motor stator magnetic poles 15 formed on the inner circumferential surface thereof. Each motor stator magnetic pole 15 serves as a rotation-drive magnetic pole excited by a rotation-drive coil 14. The rotation-drive coil 14 is wound around the motor stator magnetic pole 15 through an insulating member 13.

A plurality of teeth pitched at a predetermined interval in parallel with the rotating shaft of the motor rotor 12 are arranged on the inner circumference of the motor stator magnetic poles 15, though they are not shown in the drawing. These teeth are well known and are generally called salient pole teeth. Also in the following description, the teeth will be referred to as salient pole teeth.

On the other hand, the motor rotor 12 is cylindrical and has a hollow hole H that passes through the shaft. The motor rotor 12 is rotatably disposed inside the motor stator 11 through vacuum roller bearings 17 and 18. The vacuum roller bearings 17 and 18 are arranged so as to be distant from each other and coaxial with respect to the motor stator 11. Motor rotor magnetic poles 16 are arranged around the outer circumferential surface of the motor rotor 12 so as to confront the motor stator magnetic poles 15 of the motor stator 11.

Each motor rotor magnetic pole 16 is made of a magnetic metal. A plurality of salient teeth are arranged around the outer circumferential surfaces of the motor rotor magnetic poles 16 so as to be in parallel with the teeth on the inner circumferential surfaces of the motor stator magnetic poles 15. A train of teeth of the motor rotor magnetic poles 16 are pitched at the same interval as that of the motor stator magnetic poles 15, but are arranged out of phase with the train of teeth of the motor stator magnetic poles 15. Thus, by sequentially exciting the train of teeth of the motor stator magnetic poles 15 in the circumferential direction while controlling the supply of current to the rotation-drive coils 14, the train of teeth of the motor rotor magnetic poles 16 are attracted to the teeth of the motor stator magnetic poles 15, so that the motor rotor 12 is rotated inside the motor stator 11.

The vacuum roller bearings 17 and 18 are such that the inner races and outer races thereof are plated with soft metal such as gold or silver for metal lubrication that is free from discharging gases. An inner race 17a of the bearing 17 is fitted with the outer surface on one end of the motor rotor 12, and an outer race 17b thereof is fixed by a bearing press 21 to a housing member 23 on one end of the motor stator 11 through an annular mounting member 22A.

An inner race 18a of the other bearing 18 is fitted with the outer surface on the other end of the motor rotor 12, and an outer race 18b thereof is fixed to a housing member 24 on the other end of the motor stator 11 through an annular mounting member 22B. A body to be driven to rotate is bolted onto one end face 12A of the thus rotatably supported motor rotor 12.

A collar portion 23a is disposed on the inner circumference of the housing member 23 to which the outer race 17b of the bearing 17 is fixed, the collar portion 23a annularly projecting toward the outer circumferential surface of the motor rotor 12. A collar portion 24a is disposed on the inner circumference of the housing member 24 to which the outer race 18b of the bearing 18 is fixed, the collar portion 24a annularly projecting toward the outer circumferential surface of the motor rotor 12. These collar portions 23a and 24a define the space in which the motor stator magnetic poles 15 are accommodated.

A variable-reluctance resolver 26 is accommodated in a space S located on one end of the motor stator magnetic pole 15 defined by the collar portion 23a. The variable-reluctance resolver 26 is a high-resolution rotation detector serving as a displacement detecting means for detecting a relative displacement between the motor stator 11 and the motor rotor 12 to position the motor with high accuracy. A stator 28 of the resolver 26 having coils 27 is secured to the inner circumferential surface of the motor stator 11. On the other hand, a rotor 29 of the resolver 26 is secured to a stepped portion of the motor rotor 12 of nonmagnetic metal so as to confront the stator 28.

A plurality of teeth pitched at a predetermined interval in parallel with the rotating shaft of the motor rotor 12 are arranged on the inner circumferential surface of the magnetic poles of the stator 28 of the variable-reluctance resolver 26 in a manner similar to the motor stator magnetic poles 15. The coils 27 are wound around the respective magnetic poles. On the other hand, the rotor 29 of the resolver 26 has a train of teeth pitched at the same interval as that of the motor rotor magnetic poles 16 so as to be out of phase with one another. The details of the variable-reluctance resolver 26 and its control circuit will be described later.

As the motor rotor 12 rotates, the rotor 29 of the resolver 26 rotates, and the reluctance with respect to the magnetic poles the stator 28 varies. A reluctance change is detected by setting the reluctance change so that the basic wave component of the reluctance change equals an n cycle per one revolution of the rotor 29, and the detected value is digitized by a resolver control circuit to be used as a position signal, so that the rotational angle position (or rotational speed) of the motor rotor 12 can be detected. Reference numeral 31 denotes a magnetic shield plate fixed to the motor stator 11 so as to be interposed between the motor stator magnetic pole 15 and the resolver 26. Reference numeral 32 denotes a wiring hole passing through the motor stator 11, and a mold agent 42 is filled therein as described later.

A cylindrical partition wall 33 made of a nonmagnetic metal such as nonmagnetic stainless steel SUS304 is disposed so as to separate the motor stator 11 from the motor rotor 12 in a clearance 19 between the confronting surfaces of the motor stator 11 and the motor rotor 12. One end of the partition wall 33 is welded onto the inner circumferential surface of the collar portion 23a of the housing member 23 that partitions the space S on one end of the motor stator magnetic pole 15. The other end of the partition wall 33 is welded with the collar portion 24a of the housing member 24 that partitions the space on the other end of the motor stator magnetic pole 15. The inner circumferential surface of the motor stator magnetic pole 15 is brought into close contact with the partition wall 33. In this embodiment, the two bearings 17 and 18 support the motor rotor 12 at positions of both sides of the member 33 constituting the partition wall in the longitudinal direction of the motor rotor 12, so that loads applied to the bearings 17 and 18 are directly received by the housing member 23, the motor stator 11 and the housing member 24, which constitutes the housing of the sealed actuator.

Thus, both ends of the partition wall 33 is hermetically integrated with the housing. Hence, the space in which the rotation-drive coils 14, the motor stator magnetic poles 15, the coils 27 and the stator 28 of the resolver 26, and the like are accommodated is completely hermetically isolated from the inside of the motor rotor 12 in the inner circumference of the motor stator 11.

Further, ring-shaped reinforcing members 40 and 41 made of a nonmagnetic metal are attached closely without gap to a portion of the partition wall 33 corresponding to the motor stator 11 and the resolver 26. The reinforcing members 40 and 41 are made of the same material as the nonmagnetic partition wall. Thus, since the reinforcing members can receive the inner pressure deforming force to the partition wall by expansion of the mold material having a large expansion coefficient even when the mold agent is also used as the reinforcing means and the stator is heated to a high temperature at bake-out, the partition wall is not deformed. The reinforcing members also serve to reinforce the partition wall 33 when it is subjected to a thinning process through cutting or grinding an inner diameter side thereof.

Moreover, the mold agent 42 as reinforcing means is charged fully into the space S in which the resolver 26, the rotation-drive coils 14 of the motor stator magnetic poles 15, and the like are accommodated while partitioned by the collar portion 23a of the housing member 23 on one side, into the space in which the rotation-drive coils 14 are accommodated while partitioned by the collar portion 24a of the housing member 24 on the other side, and into the wiring hole 32. In this embodiment, although both the reinforcing members and the mold agent are used as the reinforcing means, only one of them may be used according to the circumstances.

It may be noted that electron-beam welding or laser-beam welding, which can restrict the rise of temperature to a local portion, is employed to weld one end of the partition wall 33, because the welding operation of the partition wall 33 is performed under the state where the parts made of material that are relatively low heat resistant, such as the rotation-drive coils 14, insulators thereof 13, and the coils 27 of the resolver 26, are contained.

A vacuum flange portion 35 having a vacuum seal 34 is formed by extending the outer circumference of the housing member 23 on one side of the motor stator 11. The vacuum flange portion 35 allows the sealed actuator 10 to be mounted on a vacuum apparatus.

Further, an origin detector 60 is disposed on the housing member 24 on the other side. The origin detector 60 has a magnetic sensor 61 and a single magnet 62. The magnetic sensor 61 is embedded in a recess formed in the outer circumferential surface of the nonmagnetic housing member 24. The magnet 62 is attached to one place on the end face of the other end of the motor rotor 12 on the bearing 18 side so that the magnet 62 can confront the magnetic sensor 61 through a thin wall of the housing member 24. The magnet 62 rotates together with the rotation of the motor rotor 12, and the magnetic sensor 61 outputs a position signal in response to the magnetism of the rotating magnet 62.

Figure 2:
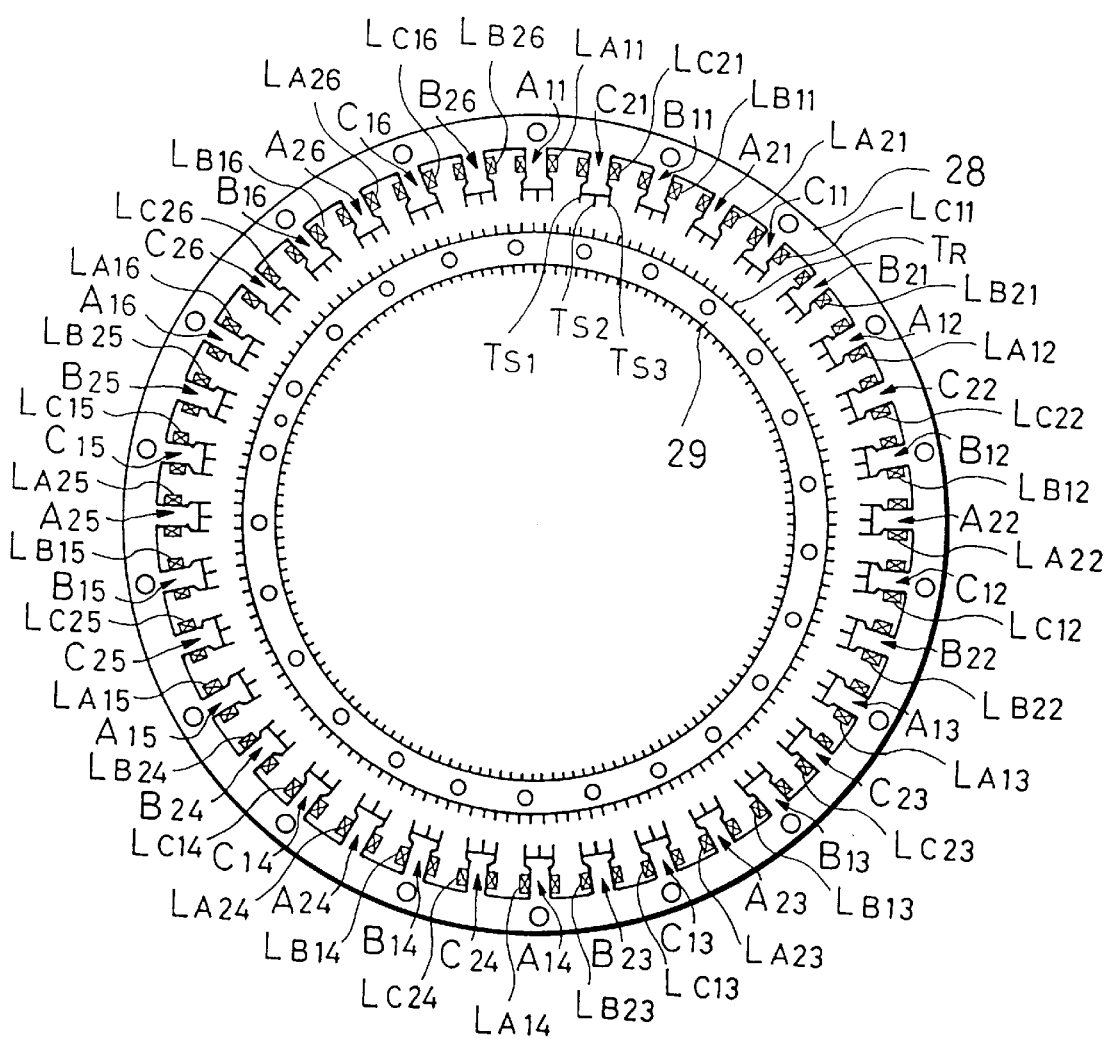
FIG. 2 is a plan view for explanation of arrangement of magnetic poles of a variable-reluctance resolver.

The above mentioned variable-reluctance resolver 26 will be described. As the variable-reluctance resolver, one that is disclosed in Japanese Patent Unexamined Publication No. Hei. 5-122916 can be preferably used. As shown in FIG. 2, this variable-reluctance resolver is constructed so that the resolver stator 28 has 3-phase 18-pole first magnetic poles $A_{11}$ to $C_{16}$, $B_{11}$, to $B_{16}$, $C_{11}$ to $C_{16}$ formed with a predetermined interval, and 3-phase 18-pole second magnetic poles $A_{21}$ to $C_{26}$, $B_{21}$ to $B_{26}$, $C_{21}$ to $C_{26}$ formed with a predetermined distance at intermediate position of the first magnetic poles $A_{11}$ to $C_{16}$, $B_{11}$, to $B_{16}$, $C_{11}$ to $C_{16}$. The respective magnetic poles are arranged in the order of $A_{11}$-$C_{21}$-$B_{11}$-$A_{21}$-$C_{11}$-$B_{21}$-$A_{12}$-$C_{22}$ - - -. For the respective magnetic poles $A_{11}$ to $C_{26}$, three teeth $T_{S1}$ to $T_{S3}$ are formed at end surfaces of the inner circumference side, and exciting windings $L_{A11}$ to $L_{C26}$ are wound around at the center portion. Thus, magnetic poles at the position of 180° are in the same phase to each other.

The resolver rotor 29 includes a train of teeth with the phase shifted from the teeth $T_{S1}$ to $T_{S3}$ of the resolver stator 28 and with the same pitch as those.

Figure 3:
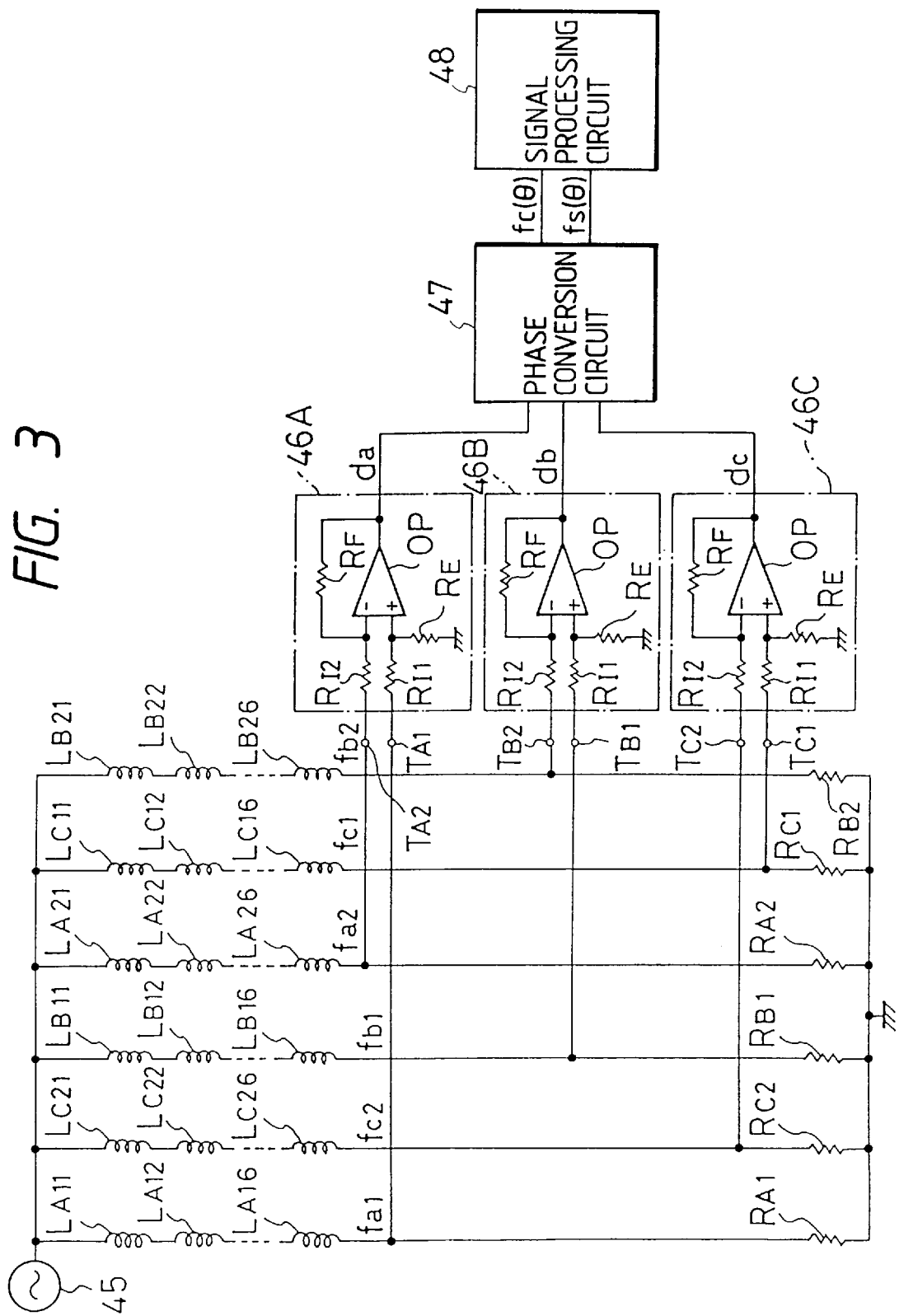
FIG. 3 is a circuit diagram of the resolver.

FIG. 3 shows the structure of a resolver control circuit. One end of the exciting windings $L_{A11}$ to $L_{C26}$ is connected to a single-phase AC power source 45, and the other end thereof is grounded through resistors $R_{A1}$ to $R_{C2}$, so that i-phase output signals fa1 ($\theta$) to fc1 ($\theta$) and fa2 ($\theta$) to fc2 ($\theta$) in accordance with current change in response to change of reluctance between the output terminals $T_{A1}$ to $T_{C2}$ leading from a portion between the exciting winding and the resistor and the slot tooth $T_R$ of the rotor 29, are output to the terminals $T_{A1}$ to $T_{C1}$, and $T_{A2}$ to $T_{C2}$, and input into differential amplifiers 46A to 46C. The differential amplifications 46A to 46C calculate difference values, which are converted into two-phase signal by a phase conversion circuit 47, so that two-phase signal fC($\theta$) and FS($\theta$) are supplied to a signal processing circuit 48.

The signal processing circuit 48 includes a multiplier, a synchronous rectifier into which an AC voltage is input as a synchronizing signal from an AC power source for excitation, and the like. An output signal of the synchronous rectifier is output as a speed signal and a digital value indicating a rotation speed is output.

That is, when single-phase AC current is supplied to the exciting windings $L_{A11}$ to $L_{C26}$ to excite, resolver signals fa1($\theta$) to fc1 ($\theta$) and fa2 ($\theta$) to fc2 ($\theta$) generated in the exciting windings $L_{A11}$, to $L_{C26}$ are expressed by the following equations (1) to (6).

$$fa1(\theta)=A0+A1 \cos \theta+A2 \cos 2\theta+A3 \cos 3\theta+A4 \cos 4\theta \quad (1)$$

$$fb1(\theta)=A0+A1 \cos (\theta-120°)+A2 \cos 2(\theta-120°)+A3 \cos 3(\theta-120°)+A4 \cos 4(\theta-120°) \quad (2)$$

$$fc1(\theta)=A0+A1 \cos (\theta+120°)+A2 \cos 2(\theta+120°)+A3 \cos 3(\theta+120°)+A4 \cos 4(\theta+120°) \quad (3)$$

$$fa2(\theta)=A0+A1 \cos (\theta+180°)+A2 \cos 2(\theta+180°)+A3 \cos 3(\theta+180°)+A4 \cos 4(\theta+180°) \quad (4)$$

$$fb2(\theta)=A0+A1 \cos (\theta-300°)+A2 \cos 2(\theta-300°)+A3 \cos 3(\theta-300°)+A4 \cos 4(\theta-300°) \quad (5)$$

$$fc2(\theta)=A0+A1 \cos (\theta+300°)+A2 \cos 2(\theta+300°)+A3 \cos 3(\theta+300°)+A4 \cos 4(\theta+300°) \quad (6)$$

Since the respective resolver signals fa1 to fc1 and fa2 to fC2 are supplied to the differential amplifiers 46A to 46C, output signals da to dc of these differential amplifiers 46A to 46C are expressed by the following equations (7) to (9).

$$da=2A1 \cos \theta+2A3 \cos 3\theta \quad (7)$$

$$db=2A1 \cos (\theta-120°)+2A3 \cos 3(\theta-120°) \quad (8)$$

$$dc=2A1 \cos (\theta+120°)+2A3 \cos 3(\theta+120°) \quad (9)$$

As is apparent from these equations (7) to (9), the differential amplifiers 46A to 46C can produce three-phase signals da to dc in which only third harmonic distortion remains among harmonic distortion of permeance. These threephase signals da to dc are converted through the phase conversion circuit 47 into two-phase signals fc($\theta$) and fS($\theta$) in which the third harmonic distortion is cancelled. The signal processing circuit includes the multiplier, the synchronous rectifier into which an AC voltage is input as a synchronizing signal from the AC voltage for excitation, and the like. An output signal of the synchronous rectifier is output as a speed signal, and a digital value indicating a rotation speed is output. Japanese Patent Unexamined Publication No. Hei 5-122916 may be referred to for the details of the resolver and resolver control circuit.

The attachment and operation of the sealed actuator will next be described. The sealed actuator 10 is mounted by, for example, fixing the flange portion 35 to a vessel wall 37 of a vacuum vessel with a bolt 38. The front end portion of the motor rotor 12 of the sealed actuator 10 is inserted, as an output shaft A, into the vacuum vessel interior V from a mounting hole 39 arranged in the vessel wall 37.

The space of the motor stator 11 hermetically sealed and isolated from the motor rotor 12 with the partition wall 33 in the sealed actuator 10 is completely isolated from the vacuum vessel interior V. The hollow hole H passing through the motor rotor 12 communicates with the vacuum vessel interior V, but is isolated from the atmosphere while sealed with a seal 36. As a result, gas and moisture contained in rotation-drive coil 14 of the motor stator 11, the coil 27 of the resolver 26, and their insulators 13 and the like are prevented from being dispersed in the vacuum vessel interior V to contaminate the vacuum environment.

Therefore, the vacuum vessel interior V can not only be easily discharged, but also be rapidly evacuated to a predetermined ultra-high vacuum even during bake-out, achieving high production efficiency. In addition, coil insulators are not necessarily be made of expensive nonorganic materials. Moreover, in the case of semiconductor manufacturing, there is no danger of etching the aforementioned coils, insulators, and the like since they are protected by the partition wall 33 made of a stainless steel from etching reactive gas introduced into the vacuum vessel interior V after evacuation.

Further, since the rotation-drive coils 14 are sealed without clearance with the mold agent 42, heat can be radiated even if the coils 14 are heated while being energized. This means that burning of the coils due to local heat reserve can be prevented. It may be noted that the rotation-drive coils 14 can be forcibly cooled easily by flushing air or water into the motor stator 11 whenever necessary since the coils 14 are located on the side of the atmosphere.

Still further, not only the partition wall 33 is reinforced by the reinforcing members 40 and 41, but also the spaces on both ends of the motor stator 11 are reinforced by charging the mold agent 42. Therefore, for example, even if the sealed actuator 10 is used for an ultra-high vacuum apparatus, it is stable without occurrence of such a trouble that the partition wall 33 exposed to vacuum is deformed-by being swollen.

Further, in the case of the conventional inner rotoractuator of this type, for example, the inner circumferential surface of the partition wall 33 is cut or ground after the partition wall 33 has been welded to the housing member, so that the partition wall 33 is finished to a thickness of several tens $\mu$m. Therefore, the partition wall 33 escapes from a cutting (grinding) tool during cutting or grinding operation, which in turn impairs concentricity accuracy of the inner circumferential surface of the partition wall, thereby causing the partition wall to come in contact with the outer circumferential surface of the motor rotor magnetic poles 16. This results in a low yield. Unlike such conventional example, this embodiment of the invention has greatly improved the yield by reinforcing the partition wall 33 with the reinforcing members 40, 41 and the mold agent 42.

Still further, feedback control can guarantee high rotational positioning accuracy of the motor rotor 12. That is, when the rotation-drive coils 14 of the motor stator 11 are energized, electromotive force is produced. As a result, the teeth of the motor stator magnetic poles 15 are excited. Since the partition wall 33 made of nonmagnetic metal is very thin, the magnetic fluxes produced reach the motor rotor 12 through the partition wall 33. Thus, a magnetic circuit is formed between the magnetic poles 15 of the thus energized motor stator and the confronting motor rotor magnetic poles 16, allowing the confronting teeth on both the magnetic poles to attract each other strongly.

Motor current controlled through a not shown drive unit is applied sequentially to the plurality of rotation-drive coils 14 that are sequentially arranged in the circumferential direction. As a result, the teeth of the motor stator magnetic poles 15 are sequentially excited, which in turn causes the motor rotor 12 to rotate. When the motor rotor 12 starts rotating, the rotor 29 of the resolver 26 also rotates. As a result, reluctance between the stator 28 and the teeth varies. Such variations are digitized by a resolver control circuit of the not shown drive unit and utilized as position signals. The thus obtained position signals permit accurate feedback control of rotational angles of the rotor 29 and hence of the rotational angles of the motor rotor 12. Therefore, highly accurate positioning can be implemented.

In this case in particular, since the variable-reluctance resolver in which a resolver rotor described later is attached to a nonmagnetic substance, a differential circuit is adopted, a magnetic shield plate is adopted, and so on, is used as the rotation detecting resolver of the motor rotor 12, magnetism surrounding the resolver from the motor stack can be cancelled out to thereby stabilize the control, unlike an ordinary resolver in which it is extremely difficult to control since the magnetism generated from the motor stack surrounds the resolver.

Figure 4:
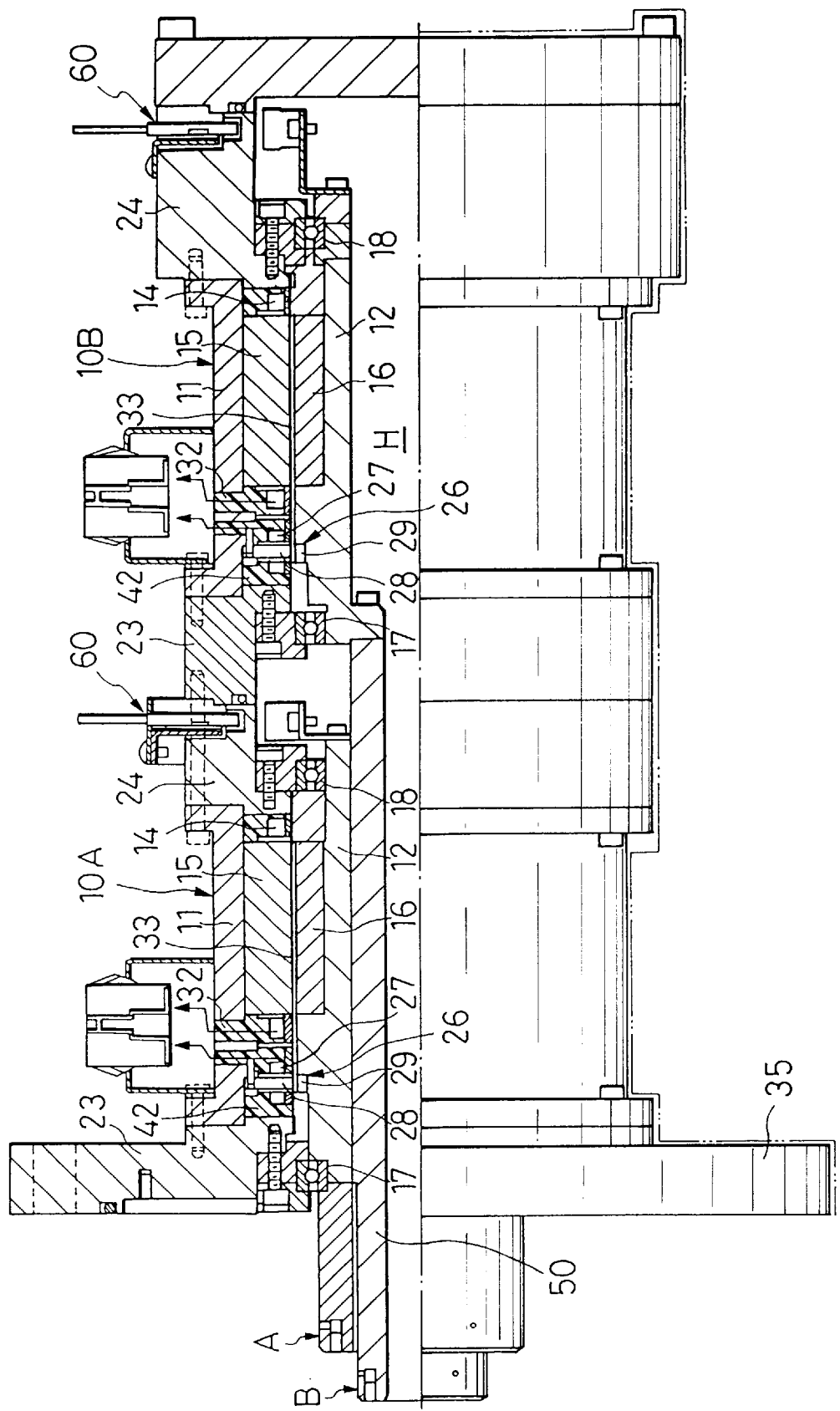
FIG. 4 is a side sectional view showing a sealed actuator of a second embodiment of the invention.

A second embodiment of the invention will next be described. FIG. 4 shows the second embodiment of the invention. This embodiment is a coaxial two-shaft actuator unit having two output shafts A and B. Taking advantage of the hollowed inner rotor structure of the sealed actuator 10 of the first embodiment of the invention and using the sealed actuator of the first embodiment as a unit actuator, this actuator unit is formed by coupling the two sealed actuators 10 in series.

The output shaft A uses the motor rotor 12 of a first sealed actuator 10A as it is. The output shaft B is formed by mounting an extension shaft 50 to the motor rotor 12 of a second sealed actuator 10B and allowing the extension shaft 50 to project from the output shaft A by taking advantage of the hollow hole H passing through the motor rotor 12 of the sealed actuator 10A.

This embodiment is a coaxial two-shaft sealed actuator in which the first and second sealed actuators are coupled and the output shafts A and B are coaxially arranged. However, the invention is not limited to this arrangement, but may be applied to a sealed actuator of coaxial three or more shafts in which three or more sealed actuators are coupled and the output shafts are coaxially arranged.

Other structural aspects and operation of this embodiment are substantially the same as those of the first embodiment. Thus, the same structural elements are designated by the same reference characters and detailed description thereof will be omitted.

The necessity and effects of such a sealed actuator of coaxial two or more shafts will be described. In an apparatus including a plurality of wafer transport arms under vacuum such as scaler type or frog leg type arms, a plurality of rotation motors are required. Under a vacuum environment, in order to make a contact area to the outside as small as possible, and to effectively use the space, the attachment holes for the motors and the like are required to be as small as possible. Further, in order to transport the wafer horizontally and straight with as little vibration as possible, the moment acting on the tip ends of the arms must be strongly kept by the rotor support portion.

Then, a plurality of sealed actuators each described in FIG. 1 are coupled coaxially at the housing portions, and the coupling portions are closely connected (close contact by welding, O-ring, metal gasket, etc.). The space where the motor rotor is disposed is separated from the space outside the housing. The hollow output shaft A of the motor rotor 12 of the first sealed actuator 10A is coaxially arranged to the output shaft B extended through the extension shaft 50 from the motor rotor 12 of the second sealed actuator 10B, and they are protruded from the common opening provided in the housing member 23. According to this, it is possible to decrease the surface area in vacuum and to lessen the number of the hole where the motor is attached to one.

In order to transport the wafer horizontally and straight with less oscillation, it is necessary to hold the moment acting on the tip end of the arm by the rotor support portion strongly. In this sealed actuator, bearings are a plurality of rolling bearings, and the rolling bearings are arranged such that they are located at both sides of the member constituting the partition wall in the axial direction to sandwich the partition wall constituting member so that the force acting on the bearings are directly received by the housing without intervening the partition wall. Accordingly, it is possible to make a wide span of arrangement of the bearings even to a moment load acting in the case where an arm or the like is attached to the rotor and a load is put on the tip thereof, the force acting on the bearings hardly act on the partition wall but is applied directly to the housing, so that it is possible to extremely decrease a fear that the partition wall is broken. Also, it is not always necessary to keep concentricity of two output shafts by using other auxiliary bearings.

As in the second embodiment, when the extension shaft 50 is fixed to the motor rotor 12 of the second sealed actuator 10B, and the extension shaft 50 is protruded from the output shaft A, the materials of the motor rotors become common so that the cost of part production can be reduced. Further, in FIG. 4, if the shape of the motor rotor 12 of the second sealed actuator 10B is made equal to that of the motor rotor 12 of the first sealed actuator 10A, a flange portion is provided at the tip end of the extension shaft 50, and the motor rotor 12 of the second sealed actuator is connected at the flange portion, the housings 24, 24 can be made common, whereby the first and the second sealed actuators can be made common. Accordingly, since the parts constituting the actuator are made common, the cost of part production can be further reduced, and exchange of parts at maintenance can be further made easy.

Next, a second example of a variable-reluctance resolver will be described with reference to FIG. 5.

When arms of a plurality of shafts are driven under vacuum environment, if a rotation position of the present arm is not recognized at switching of a power source, there is a possibility that the arms collides with the wall of a vacuum chamber or with the shutter between the vacuum chambers. Thus, in the first embodiment described above, the origin detector 60 is provided (see FIG. 1).

However, in the actuator including a plurality of shafts, there are problems that the origin detector must be disposed for each of the plurality of shafts, and if the positions of the plurality of shafts at present can not be recognized, sequence of driving the plurality of arms into the origin can not be specified. Further, there is a problem that an absolute (absolute position detection) sensor is not sufficient in resolution for smooth driving of arms under vacuum environment, so that smooth driving can not be made.

As a countermeasure to this, it is proposed to adopt a variable-reluctance resolver including a coarse resolver for detecting the absolute position of one rotation of a rotation shaft and a fine resolver for detecting a rotation position in finer resolution.

Figure 5:
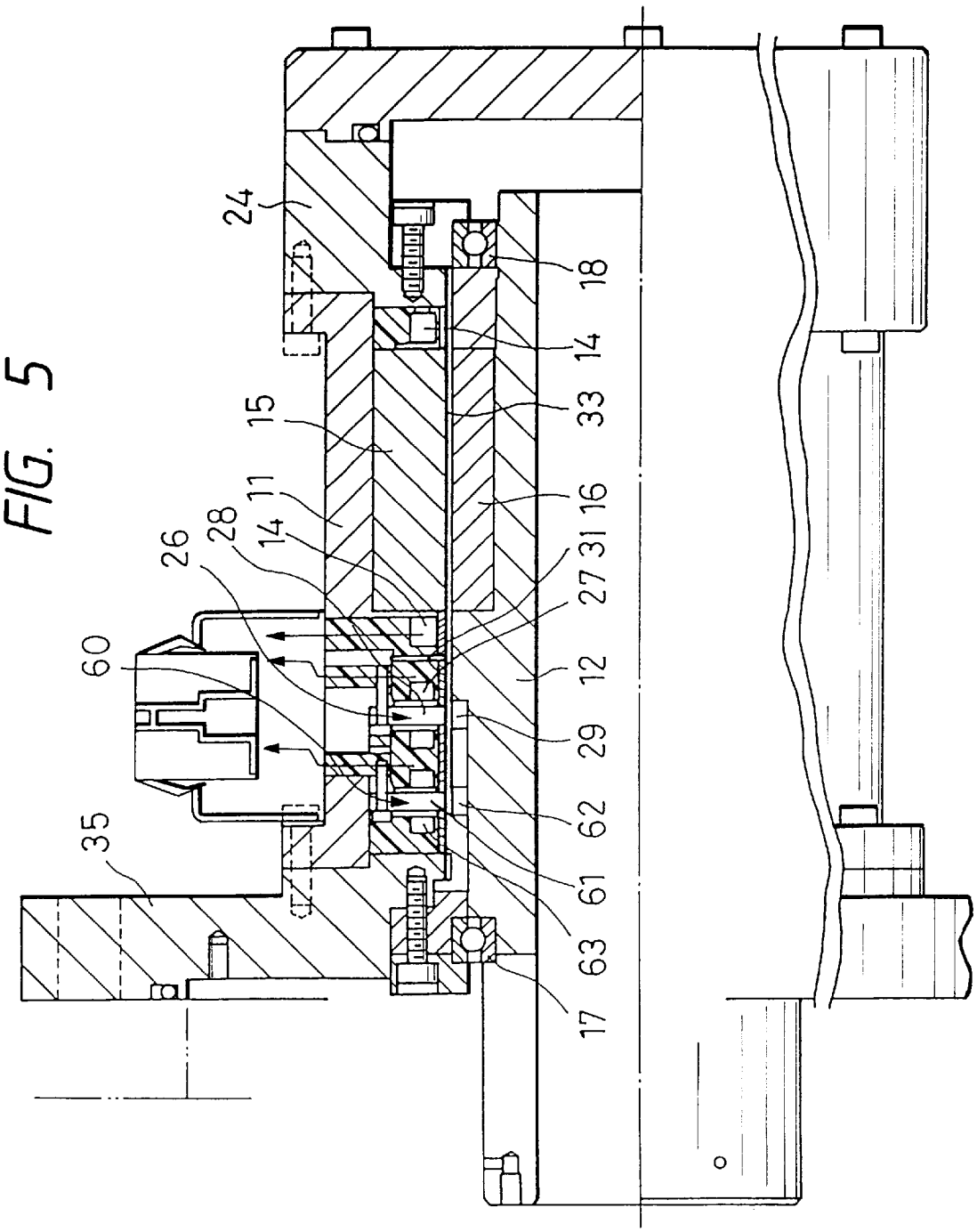
FIG. 5 is a side sectional view showing a sealed actuator provided with a second variable-reluctance resolver.
Figure 6:
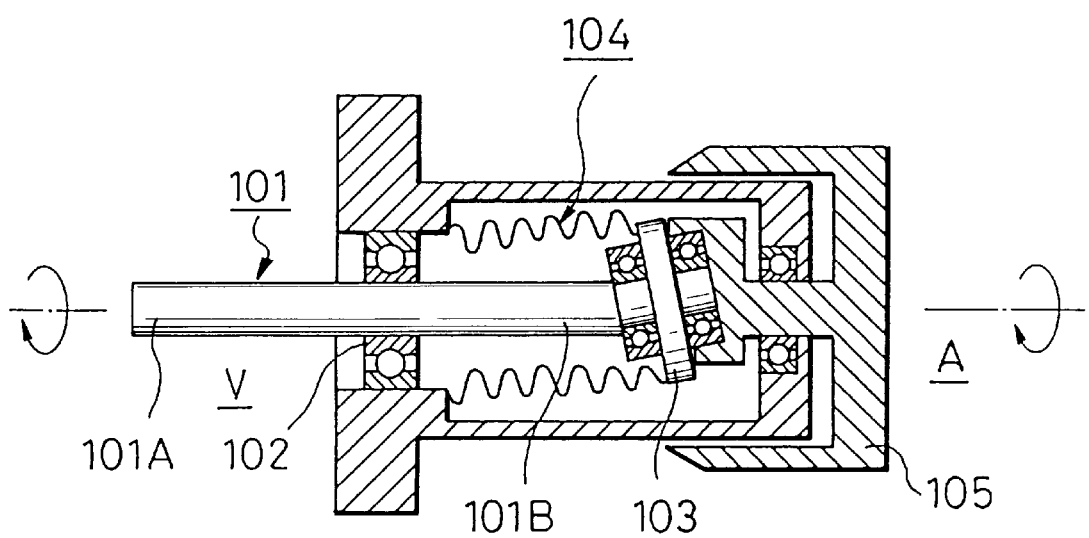
FIG. 6 is a sectional view showing an example of a conventional sealed actuator.
Figure 7:
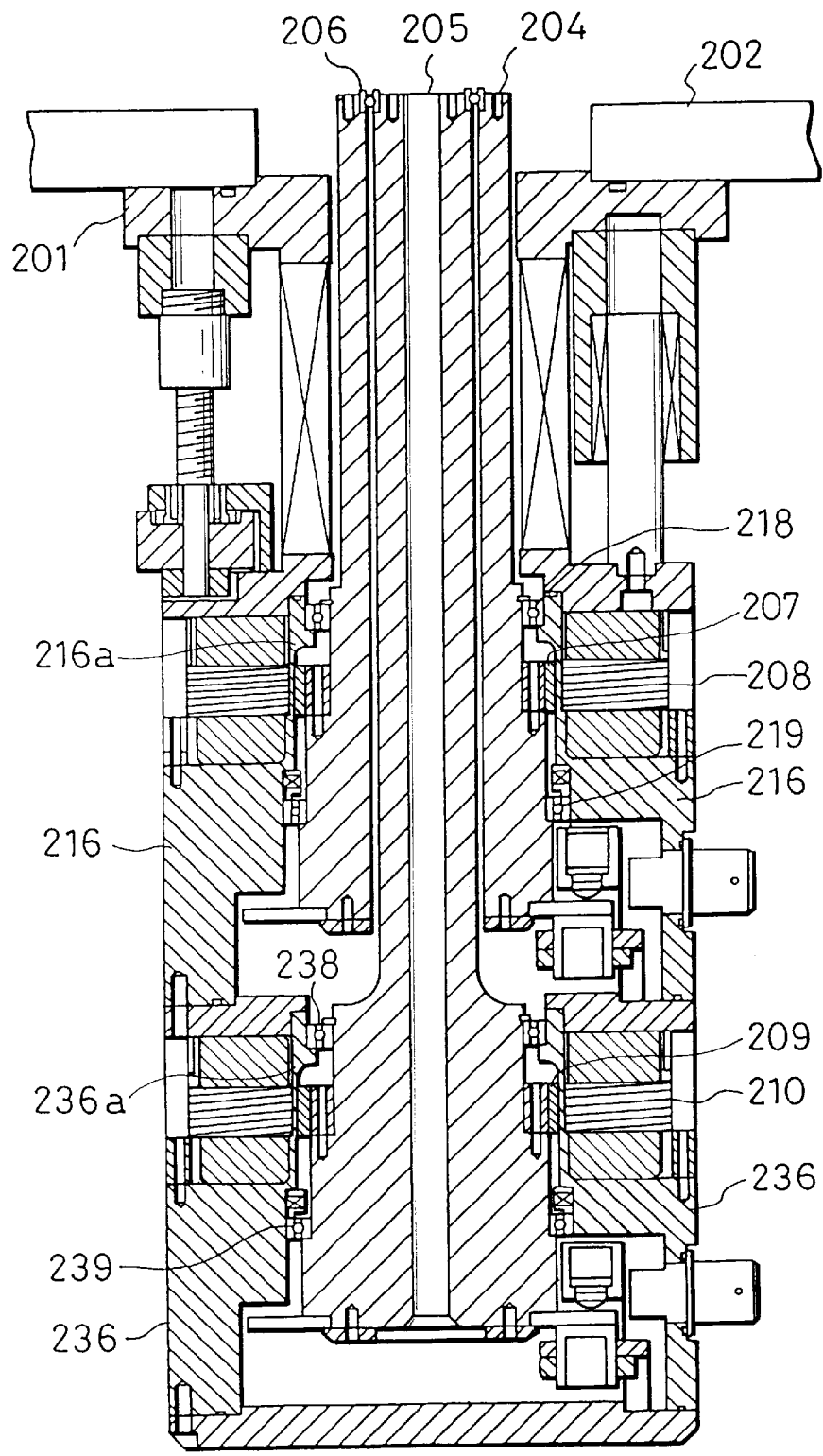
FIG. 7 is a sectional view showing another example of a conventional sealed actuator.

FIG. 5 is a sectional view showing a sealed actuator to which a variable-reluctance resolver including a coarse resolver and a fine resolver is attached.

The same parts as those in the first embodiment shown in FIG. 1 are designated by the same reference numerals and detailed description thereof will be omitted, but the resolver will be described.

In FIG. 5, reference numeral 60 denotes a coarse resolver, and 26 denotes a fine resolver. The fine resolver 26 is the same as the resolver in the first embodiment. The coarse resolver 60 has almost the same structure as that of the fine. resolver 26. A resolver stator 61 including a coil 63 is attached to the inner circumferential surface of the motor stator 11, and a resolver rotor 62 is fixed to a stepped portion of the motor rotor 12 while being opposite to the stator 61. A plurality of teeth with a constant pitch are provided in the inner circumferential surface of magnetic poles of the resolver stator 61 in parallel with the rotation shaft of the motor rotor 12. The coil 63 is wound around the respective magnetic poles. The resolver 62 includes a train of teeth with the same pitch and shifted phase.

As a resolver control circuit for processing detection signals of the coarse resolver 60 and the fine resolver 26, the resolver control circuit shown in FIG. 3 may be used.

The coarse resolver 60 detects the absolute position of one rotation of the rotation shaft. The fine resolver 26 detects the rotation position of the rotation shaft with finer resolution.

Since the fine resolver 26 of rotation position detector with fine resolution is disposed near the coarse resolver 60 for detecting the absolute position of one rotation at the output shaft side, when wafer transport arms in the vacuum, for example, a plurality of arms of scaler type or frog leg type are driven by using a link and the like, the angle of the present arm can be recognized by the coarse resolver at switch-on of power source so that return. to the origin becomes unnecessary. Further, when the arms are driven smoothly and with high accuracy, the fine resolver 26 can detect the position.

Since the coarse resolver and the fine resolver can be made same to each other in the structure of resolver windings, it is not necessary to provide a plurality of control circuits as shown in FIG. 3. That is, at the switch-on of the power source, the coarse resolver 60 is connected to the control circuit to recognize the present position, and the fine resolver 26 is connected to the control circuit at the subsequent driving to detect rotation positions.

Next, the reason why the sealed actuator of this embodiment of the invention adopts the variable-reluctance motor will be described.

As kinds of motors, there is a inductive motor using a sliding torque between an eddy current generated in the rotor by rotation of a stator magnetic field and the stator magnetic field, or a synchronous motor using attraction force between the rotor of a permanent magnet and the stator magnetic field. In the case where the motor is used under vacuum as in the present invention, the inductive motor has problems that since it can not effectively dissipate the heat generated by the eddy current in the rotor, the temperature of the rotor rises, the shape of the motor is deformed, the discharged gas is increased.

In the synchronous motor including the permanent magnet as the rotor, the permanent magnet is generally made of sintered magnetic powder so that the inside thereof is porous and the surface area is very large. Thus, when the motor is used in ultra-high vacuum, it has defects that gases remaining inside of the permanent magnet are not easily discharged even if the outside of the magnet is made vacuum so that a long time is required to attain the vacuum state.

Thus, in this embodiment of the invention, magnetic substance including salient pole teeth is disposed for the rotor, and the structure of the motor is basically made into magnetic variable-reluctance (VR type) stepping motor. Since this motor uses magnetic attraction force, there is no heat generated in the rotor by the eddy current as in the inductive motor. Also, since a permanent magnet is not used as a rotor, there is no defect that it takes a long time to attain the vacuum state.

Since the motor of the invention has the structure of the stepping motor, it has a feature that the torque is large. However, if laminated layers are adopted like a rotor of a general stepping motor, since the surface area is increased like the aforementioned permanent magnet, it is not preferable for use in vacuum. Then, in this embodiment, a mass (for example, ring-shaped) of steel-Material is cut and worked into salient pole teeth to form a magnetic substance.

Further, since the magnetic metal is generally apt to rust, the rotor is subjected to surface treatment such as plating of nickel stable in vacuum environment to prevent rusting, so that increase of a surface area due to rust, discharge of oxygen in high vacuum due to oxidation, corrosion due to an inert gas, and the like are prevented.

In this embodiment, although the magnetic variable-reluctance motor is adopted as the kind of the motor, it is not restricted to this motor type, but a permanent magnet may be assembled in the stator. As an example of this type of motor, there is a hybrid type (HB type) motor. Since the magnetic substance including salient pole teeth may be disposed for the rotor, the same effects as the VR type can be expected.

Next, the reason why the sealed actuator of the embodiment adopts the variable-reluctance (VR type) resolver as detecting means for detecting displacement of the rotor will be described.

In general, in a servo motor used for high accuracy positioning, an optical encoder or a magnetic encoder using a magnetic resistance element is used as position detecting means for high accuracy smooth driving. The optical encoder includes a disc with slits at the rotor side, and a light emitting element and a light receiving element at the stator side. The optical encoder detects the position by detecting the amount of light passing through the optical slits during the rotation of the rotor or the change of interference.

However, in the degas process of a step of reducing a discharged gas performed to use the optical encoder in vacuum, since the light emitting element and the light receiving element are made of semiconductor, commonly performed high temperature bake-out at more than 100° C. is difficult. Further, since some insulator must be used to prevent an electric circuit used in vacuum from shortcircuiting and resin/print substrate used as the insulator generally includes a large amount of impurities in the inside thereof, the optical encoder has a defect that it is difficult to be used in vacuum.

On the other hand, the electric encoder using the magnetic resistance element has also the same defect as the optical encoder since the element is made of semiconductor.

In this embodiment, it is necessary to provide a position detector capable of detecting rotation position of the rotor in the state that the sealing partition wall is interposed between the stator and the rotor. Then, this embodiment adopts a variable-reluctance (VR type) resolver in which a resolver rotor of magnetic metal material provided with slot teeth on the surface, is disposed at the motor rotor side, a resolver stator of magnetic poles of magnetic substance including slot teeth similar to the aforementioned slot teeth in shape and wound by detection coils, is disposed at the motor stator side, and the change of magnetic resistance (reluctance) passing through the nonmagnetic metal partition wall during the rotation of the resolver, is detected from the resolver stator side.

In general, the variable-reluctance resolver detects change of reluctance in accordance with the rotation position θ of the opposing slot teeth as change of inductance by applying AC voltage to the detection coil. It is possible to detect the output Vsinθ in which an exciting voltage component is removed, by the synchronous rectifier, and to detect the rotation position of the rotor. However, if a frequency of AC voltage exciting the detection coil is high, the eddy current generated in the nonmagnetic metal when magnetic flux passes through the sealing partition wall, increases so that detection of rotation position of the rotor becomes difficult.

Accordingly, in this embodiment, exciting is conducted by applying AC of about 1 KHz to 10 KHz necessary to suppress the generation of the eddy current in the sealing partition wall and to stably drive and control the rotor. As materials constituting the resolver rotor, a laminated steel plate is preferable in view of AC characteristics to decrease the generation of eddy current. However, lamination increases the surface area like the permanent magnet. It is desirable to lessen the surface area to a possible degree for use in vacuum. Thus, in this embodiment, the magnetic substance is formed by cutting a mass of steel material to form the salient pole teeth.

Further, as described before, since the magnetic metal is apt to rust, the resolver rotor is subjected to surface treatment such as plating of nickel stable in vacuum environment for preventing the rust, so as to prevent the increase of surface area due to rust, discharge of oxygen in ultra-high vacuum due to oxidation, and corrosion due to an inert gas.

The magnetic variable-reluctance resolver adopted in this embodiment in which the detection coil magnetic poles are disposed at the motor stator side, has a feature that it can detect the position even through the nonmagnetic partition wall. However, it has problems as follows.

That is, in the resolver of the embodiment, the nonmagnetic metal partition wall is intervened between the resolver stator and the resolver rotor. Thus, the change of detected magnetism is apt to be less. Although the improvement of S/N ratio is important, since the sealed actuator of the embodiment is equipped with the motor, there is a fear that high frequency magnetic flux of switching frequency of a motor current supplied from the motor drive power source, or leak magnetic flux from a rotating magnetic field generated from the motor stator is mixed into the resolver to lower the S/N ratio so that high accuracy position detection becomes impossible.

Accordingly, as a countermeasure to this, an attachment member of the resolver rotor is made of a nonmagnetic substance to decrease the mixture of leak magnetic flux through the driving shaft into the rotor resolver rotor and to improve the S/N ratio so that high accuracy position detection is made possible.

Further, to improve the S/N ratio, the winding of the resolver stator constituting the variable-reluctance resolver may be made into a differential circuit type so that the noise can be decreased by making the winding into the differential circuit type. This structure will be described below.

In the variable-reluctance resolver described with reference to FIGS. 2 and 3, when AC current is supplied to an exciting winding of the first magnetic pole of 3N phase in the resolver stator and to an exciting winding of the second magnetic pole of 3N phase, the current flowing through these exciting windings is changed by the reluctance change generated in response to the change of position between the first and second resolver stator magnetic poles and the resolver rotor magnetic poles, so that the change of the position is detected as the change of the exciting current.

Among these current detection values, difference values of the first and second magnetic poles with the same phase are calculated by three difference value detection means, so that three-phase signals in which only third harmonic distortion remains, can be obtained among harmonic distortions of permeance. Thus, a rotation angle or rotation speed of the rotor can be detected without influence of the harmonic distortions.

In this embodiment, since the exciting winding of the first magnetic pole and the exciting winding of the second magnetic pole of the 3N phase are configured as differential windings, effects of noise reduction can be obtained as described below.

In the above-described resolver control circuit shown in FIG. 3, since LA11 winding and LA21 winding are located at positions where the phase is inverted 180° with respect to the position of the rotor, the resolver signals are as shown by equations (1) to (6) described before. When magnetic noise of B sin αt (where, α is a switching frequency, t is a time) is superimposed to the respective resolver signals, the resolver signals are expressed by the following equations (10) to (15).

$$fa1(\theta)=A0+A1\cos\theta+A2\cos2\theta+A3\cos3\theta+A4\cos4\theta+B\sin\alpha t \quad (10)$$

$$fb1(\theta)=A0+A1\cos(\theta-120°)+A2\cos2(\theta-120°)+A3\cos3(\theta-120°)+A4\cos4(\theta-120°)+B\sin\alpha t \quad (11)$$

$$fc1(\theta)=A0+A1\cos(\theta+120°)+A2\cos2(\theta+120°)+A3\cos3(\theta+120°)+A4\cos4(\theta+120°)+B\sin\alpha t \quad (12)$$

$$fa2(\theta)=A0+A1\cos(\theta+180°)+A2\cos2(\theta+180°)+A3\cos3(\theta+180°)+A4\cos4(\theta+180°)+B\sin\alpha t \quad (13)$$

$$fb2(\theta)=A0+A1\cos(\theta-300°)+A2\cos2(\theta-300°)+A3\cos3(\theta-300°)+A4\cos4(\theta-300°)+B\sin\alpha t \quad (14)$$

$$fc2(\theta)=A0+A1\cos(\theta+300°)+A2\cos2(\theta+300°)+A3\cos3(\theta+300°)+A4\cos4(\theta+300°)+B\sin\alpha t \quad (15)$$

Since the respective resolver signals fa1 to fc1 and fa2 to fc2 are supplied to the differential amplifiers 46A to 46C, the magnetic noises Bsin αt can be differentially removed because of the same phase, and the output signals da to dc of the differential amplifiers 46A to 46C can be expressed by the following equations (16) to (18).

$$da=2A1\cos\theta+2A3\cos3\theta \quad (16)$$

$$db=2A1\cos(\theta-120°)+2A3\cos3(\theta-120°) \quad (17)$$

$$dc=2A1\cos(\theta+120°)+2A3\cos3(\theta+120°) \quad (18)$$

As is apparent from these equations (16) to (18), three-phase signals da to dc in which only third harmonic distortion remains among harmonic distortions of permeance, can be obtained from the differential amplifiers 46A to 46C, and at the same time, the noises generated from the motor are also effectively reduced. The third harmonic distortion is cancelled in the phase conversion circuit 47, and the two-phase signals fc(θ) and fs(θ) can be obtained, as described before.

In order to further improve the S/N ratio, a magnetic shield plate formed of a magnetic metal material may be interposed between the motor stator magnetic pole and the detection coil magnetic pole of the variable-reluctance resolver. This has an effect that magnetic noises generated by the motor magnetic field are bypassed by the magnetic substance superior in magnetic properties disposed between the motor and the resolver, so that the magnetic flux does not act on the resolver stator detection coil.

In this case, as the magnetic substance superior in the magnetic properties, an electromagnetic steel plate, permalloy and the like may be used.

As described above in detail, the invention relates to a sealed actuator in which a sealing partition wall made of a nonmagnetic metal material is provided between a stator magnetic pole of a motor stator and a rotor magnetic pole of a motor rotor, and a space where the motor rotor is disposed is hermetically isolated from a space where the motor stator is disposed.

According to the first aspect of the invention, the bearings of the sealed actuator for supporting the motor rotor are a plurality of rolling bearings, and the rolling bearings support the motor rotor at positions on the housings at both sides of a member constituting the sealing partition wall in a longitudinal direction of the motor rotor so that the housings directly receive a load applied to the bearings. According to this, even if an arm or the like is attached to the motor rotor and force such as bending moment caused in the motor rotor is applied to the bearings, the force does not act on the hermetically sealing partition wall, so that such a superior effect as eliminates the fear that the sealing partition wall is broken, can be obtained.

According to the second aspect of the invention, the sealed actuator adopts a variable-reluctance resolver for detecting the position of the motor rotor with respect to the motor stator. The resolver comprises a resolver rotor made of a magnetic metal material and including salient pole teeth at a side of the motor rotor; and a resolver stator including a detection coil magnetic pole at a side of the motor stator. According to this, there is obtained such a superior effect that even if the partition wall made of nonmagnetic material is interposed between both, the position of the motor rotor can be accurately detected. Since such a resolver rotor that magnetic salient poles (slot teeth) are provided on the magnetic metal material is adopted to decrease the surface area, it is made suitable for use in vacuum environment.

According to the third aspect of the invention, since at least a part of the partition wall disposed between the stator magnetic pole of the motor stator and the rotor magnetic pole of the motor rotor of the sealed actuator is reinforced by reinforcing means, even if the actuator is used in an ultra-high vacuum apparatus, there occurs no such a disadvantage that the partition wall exposed to vacuum is expanded to be deformed. Further, there is obtained such a superior effect that deformation of the sealing partition wall at thinning working of the partition wall from the inner diameter side of the motor rotor can be prevented to perform accurate thinning working.

As the reinforcing means, there are adopted such means as the use of reinforcing members, filling of a mold agent.

According to the fourth aspect of the invention, the sealed actuator is used as a unit sealed actuator, a plurality of unit sealed actuators are connected in series to each other, and a plurality of output shafts of the motor rotors are coaxially arranged. According to this, the following effects can be obtained. That is, it is possible to easily construct the sealed actuator having a plurality of coaxial shafts.

Further, when the actuator is mounted to a vacuum vessel or the like, the plurality of shafts can be inserted into the inside of the vacuum vessel or the like through one common opening, so that the number of connection portions between the actuator and the vacuum vessel or the like can be decreased.

Further, in the invention, since a variable-reluctance resolver is provided as displacement detection means, there is obtained such an effect that it is possible to prevent the magnetism from the motor stack from surrounding so that stable and high accuracy positioning control can be made.

What is claimed is:

1. A sealed actuator comprising:
   a motor stator including a stator magnetic pole excited by a rotation-drive coil;
   housings to which said motor stator is attached;
   a motor rotor including a rotor magnetic pole disposed opposite to a surface of said stator magnetic pole through a gap;
   bearings for rotatably supporting a rotation shaft of said motor rotor to said housing;
   displacement measuring means for measuring displacement of said motor rotor; and
   a hermetically sealing partition wall made of a nonmagnetic metal material and disposed at the gap between said stator magnetic pole and said rotor magnetic pole, a space where said motor rotor is disposed being hermetically isolated from a space wherein said motor stator is disposed;
   wherein said bearings are a plurality of rolling bearings, said rolling bearings supporting said motor rotor at positions on said housings at both sides of a member constituting said sealing partition wall in a longitudinal direction of said motor rotor so that said housings directly receive a load applied to said bearings,
   wherein said displacement measuring means comprises a resolver rotor made of a mass of magnetic metal material, disposed at a side of said motor rotor, and includes a salient tooth cut from said mass of magnetic metal material; and a resolver stator including a detection coil magnetic pole and disposed at a side of said motor stator.

2. A sealed actuator as claimed in claim 1, wherein said resolver rotor is fixed to a member of a nonmagnetic substance.

3. A sealed actuator as claimed in claim 1, wherein said resolver stator includes a differential circuit type winding.

4. A sealed actuator as claimed in claim 1, further comprising a magnetic shield plate made of a magnetic metal material disposed between said stator magnetic pole of said motor stator and said detection coil magnetic pole of said resolver stator.

5. A sealed actuator as claimed in claim 1, wherein said resolver rotor is fixed to a member of a nonmagnetic substance; wherein said resolver rotor includes a differential circuit type winding; and wherein said actuator further comprises a magnetic shield plate made of a magnetic metal material disposed between said stator magnetic pole of said motor stator and said detection coil magnetic pole of said resolver stator.

6. A sealed actuator comprising:
   a motor stator including a stator magnetic pole excited by a rotation-drive coil;
   a housing to which said motor stator is attached;
   a motor rotor including a rotor magnetic pole disposed opposite to a surface of said stator magnetic pole through a gap;

bearings for rotatably supporting a rotation shaft of said motor rotor to said housing;

displacement measuring means for measuring displacement of said motor rotor; and a hermetically sealing partition wall made of a nonmagnetic metal material and disposed at the gap between said stator magnetic pole and said rotor magnetic pole, a space where said motor rotor is disposed being hermetically isolated from a space wherein said motor stator is disposed;

wherein said displacement measuring means comprises a resolver rotor made of a mass of magnetic metal material, disposed at a side of said motor rotor, and includes a salient tooth cut from said mass of magnetic metal material; and a resolver stator including a detection coil magnetic pole and disposed at a side of said motor stator.

7. A sealed actuator as claimed in claim 6, wherein said resolver rotor is fixed to a member of a nonmagnetic substance.

8. A sealed actuator as claimed in claim 6, wherein said resolver stator includes a differential circuit type winding.

9. A sealed actuator as claimed in claim 6, wherein said displacement measuring means includes a coarse resolver and a fine resolver configured such that it is unnecessary to return to an origin to detect the position of the motor rotor.

10. A sealed actuator as claimed in claim 6, wherein said motor stator and said motor rotor constitutes a variable-reluctance motor.

11. A sealed actuator as claimed in claim 6, further comprising a magnetic shield plate made of a magnetic metal material disposed between said stator magnetic pole of said motor stator and said detection coil magnetic pole of said resolver stator.

12. A sealed actuator as claimed in claim 6, wherein said resolver rotor is fixed to a member of a nonmagnetic substance; wherein said resolver rotor includes a differential circuit type winding; and wherein said actuator further comprises a magnetic shield plate made of a magnetic metal material disposed between said stator magnetic pole of said motor stator and said detection coil magnetic pole of said resolver stator.

13. A sealed actuator comprising:

a motor stator including a stator magnetic pole excited by a rotation-drive coil;

a housing to which said motor stator is attached;

a motor rotor including a rotor magnetic pole disposed opposite to a surface of said stator magnetic pole through a gap;

bearings for rotatably supporting a rotation shaft of said motor rotor to said housing;

displacement measuring means for measuring displacement of said motor rotor; and a hermetically sealing partition wall made of a nonmagnetic metal material and disposed at the gap between said stator magnetic pole and said rotor magnetic pole, a space where said motor rotor is disposed being hermetically isolated from a space where said motor stator is disposed;

wherein said sealed actuator further comprises reinforcing means for reinforcing at least a part of said hermetically sealing partition wall, said reinforcing means being made of substantially the same nonmagnetic metal material as said partition wall.

14. A sealed actuator as claimed in claim 13, wherein said reinforcing means is at least one selected from a group consisting of a reinforcing member and a molding agent.

15. A sealed actuator comprising a plurality of unit sealed actuators connected in series to each other, each of said unit sealed actuators comprising:

a motor stator including a stator magnetic pole excited by a rotation-drive coil;

a housing to which said motor stator is attached;

a motor rotor including a rotor magnetic pole disposed opposite to a surface of said stator magnetic pole through a gap;

bearings for rotatably supporting a rotation shaft of said motor rotor to said housing;

displacement measuring means for measuring displacement of said motor rotor; and a hermetically sealing partition wall made of a nonmagnetic metal material and disposed at the gap between said stator magnetic pole and said rotor magnetic pole, a space where said motor rotor is disposed being hermetically isolated from a space where said motor stator is disposed;

wherein said bearings are a plurality of rolling bearings, said rolling bearings supporting said motor rotor at positions on said housings at both sides of a member constituting said sealing partition wall in a longitudinal direction of said motor rotor so that said housings directly receive a load applied to said bearings;

wherein said rotor magnetic pole includes a salient pole tooth of a steel material of a magnetic substance subjected to salient pole working; and wherein said displacement measuring means comprises a resolver rotor made of a magnetic metal material, disposed at a side of said motor rotor, and include a salient pole tooth; and a resolver stator including a detection coil magnetic pole and disposed at a side of said motor stator.

16. A sealed actuator comprising a plurality of unit sealed actuators connected in series to each other, each of said unit sealed actuators comprising:

a motor stator including a stator magnetic pole excited by a rotation-drive coil;

housings to which said motor stator is attached;

a motor rotor including a rotor magnetic pole disposed opposite to a surface of said stator magnetic pole through a gap;

bearings for rotatably supporting a rotation shaft of said motor rotor to said housing;

displacement measuring means for measuring displacement of said motor rotor; and a hermetically sealing partition wall made of a nonmagnetic metal material and disposed at the gap between said stator magnetic pole and said rotor magnetic pole, a space where said motor rotor is disposed being hermetically isolated from a space where said motor stator is disposed;

wherein said bearings are a plurality of rolling bearings, said rolling bearings supporting said motor rotor at positions on said housings at both sides of a member constituting said sealing partition wall in a longitudinal direction of said motor rotor so that said housings directly receive a load applied to said bearings.

17. A sealed actuator comprising a plurality of unit sealed actuators connected in series to each other, each of said unit sealed actuators comprising:

a motor stator including a stator magnetic pole excited by a rotation-drive coil;

a housing to which said motor stator is attached;

a motor rotor including a rotor magnetic pole disposed opposite to a surface of said stator magnetic pole through a gap;

bearings for rotatably supporting a rotation shaft of said motor rotor to said housing;

displacement measuring means for measuring displacement of said motor rotor; and a hermetically sealing partition wall made of a nonmagnetic metal material and disposed at the gap between said stator magnetic pole and said rotor magnetic pole, a space where said motor rotor is disposed being hermetically isolated from a space where said motor stator is disposed;

wherein said displacement measuring means comprises a resolver rotor made of a magnetic metal material, disposed at a side of said motor rotor, and including a salient tooth; and a resolver stator including a detection coil magnetic pole and disposed at a side of said motor stator.

18. A sealed actuator as claimed in claim 17, wherein said resolver rotor is fixed to a member of a nonmagnetic substance.

19. A sealed actuator as claimed in claim 17, wherein said resolver stator includes a differential circuit type winding.

20. A sealed actuator as claimed in claim 17, wherein said displacement measuring means includes a coarse resolver and a fine resolver.

21. A sealed actuator as claimed in claim 17, wherein said motor stator and said motor rotor constitutes a variable-reluctance motor.

22. A sealed actuator as claimed in claim 17, further comprising a magnetic shield plate made of a magnetic metal material disposed between said stator magnetic pole of said motor stator and said detection coil magnetic pole of said resolver stator.

23. A sealed actuator as claimed in claim 17, wherein said resolver rotor is fixed to a member of a nonmagnetic substance; wherein said resolver rotor includes a differential circuit type winding; and wherein said actuator further comprises a magnetic shield plate made of a magnetic metal material disposed between said stator magnetic pole of said motor stator and said detection coil magnetic pole of said resolver stator.

24. A sealed actuator as claimed in one of claims 15 to 22, wherein said rotation shaft of said motor rotor is an extension shaft fixed to said motor rotor.

* * * * *